US009474213B2

(12) United States Patent
Denson

(10) Patent No.: US 9,474,213 B2
(45) Date of Patent: Oct. 25, 2016

(54) SQUARE BALE EJECTOR SYSTEM

(71) Applicant: AGCO Corporation, Hesston, KS (US)

(72) Inventor: Shane Denson, Buhler, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 14/650,430

(22) PCT Filed: Dec. 10, 2013

(86) PCT No.: PCT/US2013/073984
§ 371 (c)(1),
(2) Date: Jun. 8, 2015

(87) PCT Pub. No.: WO2014/149090
PCT Pub. Date: Sep. 25, 2014

(65) Prior Publication Data
US 2015/0305245 A1    Oct. 29, 2015

Related U.S. Application Data

(60) Provisional application No. 61/735,161, filed on Dec. 10, 2012.

(51) Int. Cl.
*A01F 15/08* (2006.01)
*B30B 9/30* (2006.01)

(52) U.S. Cl.
CPC ......... *A01F 15/0875* (2013.01); *B30B 9/3014* (2013.01)

(58) Field of Classification Search
CPC ..................... A01F 15/0875; B30B 9/3014
USPC ........... 100/7, 188 R, 191, 218; 56/341, 343, 56/361, 474; 414/111, 497, 509, 511, 512, 414/517; 198/736, 741, 743, 744
See application file for complete search history.

(56) References Cited

U.S. PATENT DOCUMENTS

| 4,549,840 A * | 10/1985 | Ansbjer ............... A01D 90/083 198/744 |
| 4,791,865 A | 12/1988 | Naaktgeboren |
| 5,540,144 A | 7/1996 | Schrag et al. |
| 7,093,537 B2 * | 8/2006 | Dubois ............... A01F 15/0875 100/188 R |
| 7,779,755 B2 * | 8/2010 | De Rycke ........... A01F 15/0875 100/188 R |
| 2012/0266765 A1 | 10/2012 | Dumarey |
| 2013/0019765 A1 * | 1/2013 | Demon ............... A01F 15/0875 100/218 |
| 2013/0255512 A1 * | 10/2013 | Naeyaert ............... A01F 15/046 100/191 |

OTHER PUBLICATIONS

International Searching Authority/US; International Search Report for International Patent Application No. PCT/US13/73984, date of mailing Apr. 23, 2014.

* cited by examiner

*Primary Examiner* — Jimmy T Nguyen

(57) ABSTRACT

A bale ejecting mechanism includes a shuttle shiftable toward and away from the open end in repetitive ejection and retraction strokes. The shuttle has a series of projections yieldably biased to an extended position projecting into the bale case for engaging and moving a bale during an ejection stroke of the shuttle. The projections are shiftable into a retracted position disposed outside of the bale case to avoid engaging and moving a bale during an ejection stroke. The mechanism includes a selector member movable with the shuttle during ejection and retraction strokes of the shuttle but shiftable relative to the shuttle to any one of a number of selectable retaining positions in which the selector member retains selected ones of the projections in the retracted position. An adjustable shifter member is disposable in a plurality of selectable operating positions corresponding to the selectable retaining positions of the selector member.

8 Claims, 17 Drawing Sheets

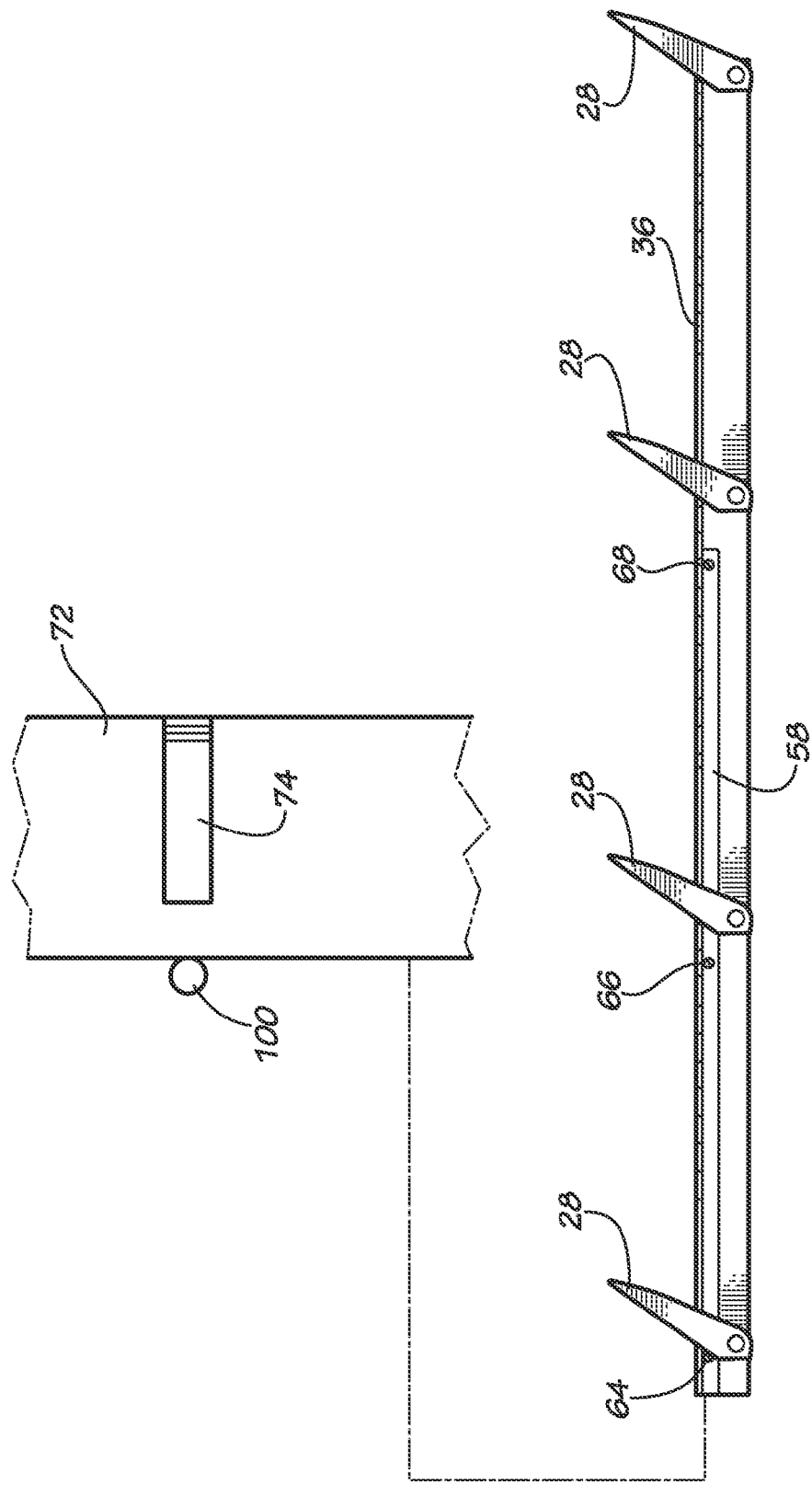

SQUARE BALE EJECTOR SYSTEM

CROSS REFERENCE TO RELATED APPLICATION

This application claims the benefit of U.S. Provisional Application No. 61/716,328, entitled SQUARE BALE EJECTOR SYSTEM filed Dec. 10, 2012, which is hereby incorporated by reference in its entirety.

BACKGROUND OF THE INVENTION

1. Field of Invention

This invention relates to extrusion-type, square balers wherein a reciprocating plunger compacts and incrementally moves successive charges of crop material rearwardly in the bale chamber toward and through a constricted outlet, and in particular, to a selective bale ejector for the baler.

2. Description of Related Art

Extrusion-type, square balers have a reciprocating plunger that compacts and incrementally moves successive charges of crop material rearwardly in the bale chamber toward and through a constricted outlet. Because the outlet is constricted relative to the larger main portion of the bale chamber, the previously formed rearmost bale, which is still in the chamber, resists being moved rearwardly by the plunger, creating a back pressure that causes new charges of crop material to be compacted against the previous bale by the plunger as it pushes both the new material and the previous bale toward and through the outlet.

U.S. Pat. No. 5,540,144, which is assigned to the assignee of the present invention and hereby incorporated by reference into the present specification, discloses a selective bale ejector. As explained in the '144 patent, extrusion-type square balers typically have at least two, and sometimes more, bales in the bale chamber at the same time during baling operations. The rearmost bale in the chamber is a finished bale that serves as a moving backstop against which new charges of material are compacted and incrementally moved rearwardly by a reciprocating plunger to create the next bale. While rearmost bales are from time-to-time automatically pushed out of the bale chamber and onto the ground or an accumulating trailer throughout a day's baling operations, there are times when the operator may wish to "prematurely" unload the rearmost bale, but not the second bale, from the chamber, such as when the operator leaves the field after the day's operations or when he moves from one field to another. By leaving the second bale in the chamber, which may only be partially formed at the time of ejecting the rearmost bale, the chamber has a pre-existing backstop for the plunger to work against when operations are resumed. This saves valuable time and money for the operator because starting new baling operations with a totally empty chamber is tedious and time-consuming.

One problem in ejecting only the rearmost bale is that the interface between the rearmost bale and the second bale may be at any one of a number of different locations along the bale chamber when the operator chooses to unload the rearmost bale. In other words, the second bale may be in various stages of completion at the time of ejecting the rearmost bale, such that the space occupied by the second bale in the chamber could range from only a small portion to a large amount, placing the interface anywhere along the bale chamber. Thus, the ejecting mechanism must be able to adapt to a number of different bale positions so as to not also engage and offload the second bale along with the rearmost bale.

However, there may also be some situations wherein the operator does wish to unload both the rearmost bale and the second bale prematurely from the chamber, either simultaneously or one-at-a-time, so as to completely empty the chamber of all crop materials. The ejecting mechanism must be flexible enough to accommodate that instance as well.

While the ejecting mechanism of the '144 patent has performed well, certain shortcomings have come to light over the years. For example, the patented ejecting mechanism requires considerable manual force to set up the selected number of bale ejecting projections or teeth of the mechanism for proper ejection by a hydraulically operated shuttle. Even greater manual force is required if crop residue, dirt or debris accumulates on the working components of the mechanism, causing them to bind up or jam. In addition, the prior ejecting mechanism requires the operator to perform the set up operations on both sides of the baler through two separate but duplicate series of steps, making the set up process both arduous and time-consuming.

OVERVIEW OF THE INVENTION

The present invention overcomes these and other shortcomings of the prior art by providing an ejector mechanism having powered set up of its bale ejecting projections into a selected pattern of extension/retraction. In a preferred embodiment, powered movement of the ejecting shuttle of the mechanism is utilized to shift components of the selector assembly to set up the bale ejecting projections in a selected pattern without manual effort. The ejector mechanism of the present invention also provides for the set-up of multiple sets of ejecting prongs simultaneously in a single operation instead of the multiple operations required by the prior art.

In one embodiment, the invention is directed to a bale ejecting mechanism for ejecting a bale from the open end of a bale case. The bale ejecting mechanism includes a shuttle shiftable axially of the bale case generally toward and away from the open end in repetitive ejection and retraction strokes. The shuttle has a series of projections yieldably biased to an extended position projecting into the bales case for engaging and moving a bale during an ejection stroke of the shuttle. The projections are shiftable into a retracted position disposed outside of the bale case to avoid engaging and moving a bale during an ejection stroke of the shuttle. The bale ejecting mechanism also includes a selector member movable with the shuttle during ejection and retraction strokes of the shuttle but shiftable relative to the shuttle to any one of a number of selectable retaining positions in which the selector member retains selected ones of the projections in the retracted position. A power device is operably coupled with the shuttle for driving the shuttle through its ejection and retraction strokes. An adjustable shifter member is disposable in a plurality of selectable operating positions corresponding to the selectable retaining positions of the selector member. The shifter member is operable when in a selected operating position to engage and shift the selector member relative to the shuttle into a corresponding retaining position as the selector member returns with the shuttle during retraction of the shuttle by the power device, thereby preparing the shuttle for completing the next ejection stroke with selected ones of the projections in the extended position.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein:

FIG. 18 is a schematic illustration of the condition of things when the selector assembly is reset at the end of each ejection stroke of the ejection mechanism to allow all of the bale engaging projections to flip up to the extended position.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
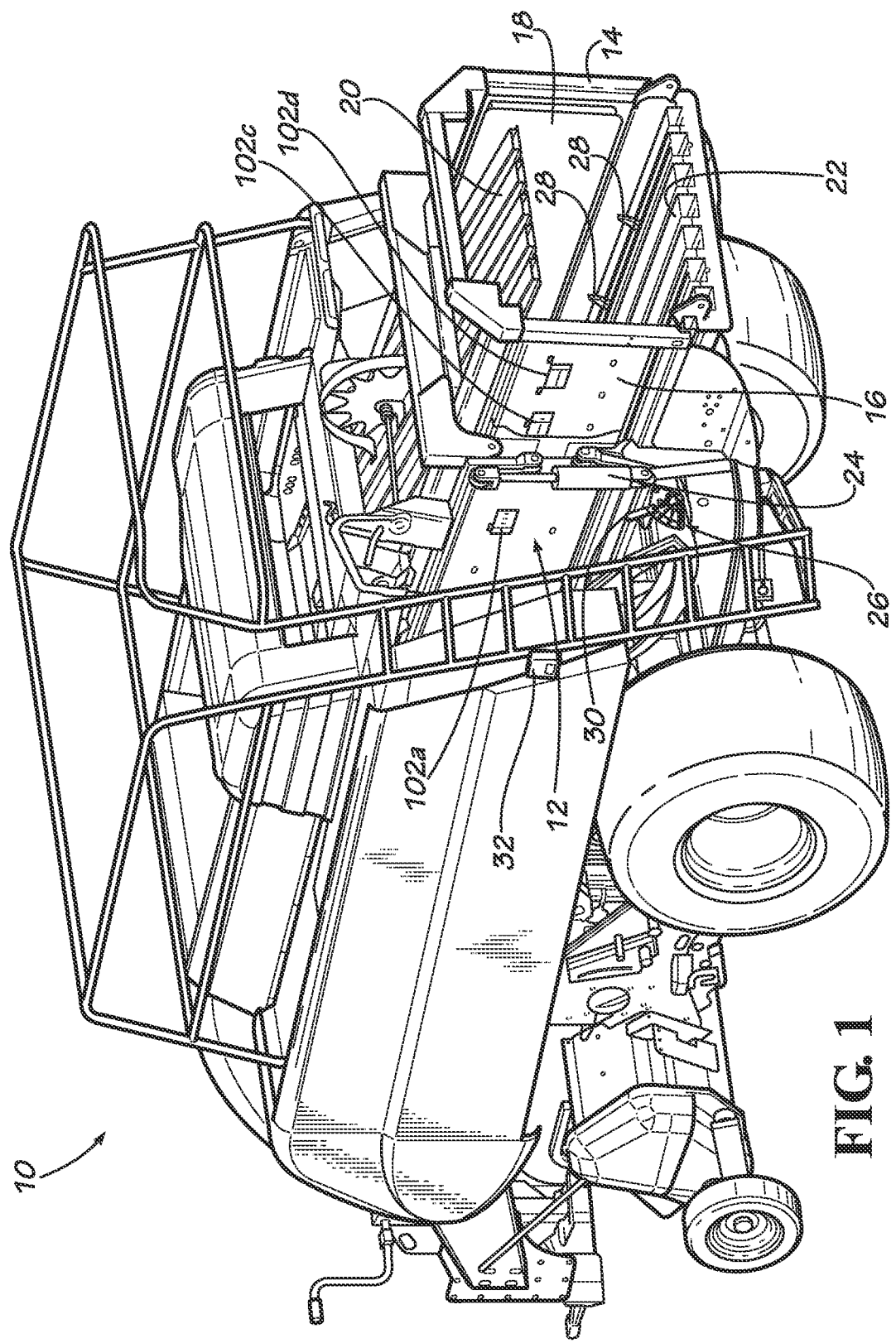
FIG. 1 is a left, rear isometric view of a baler incorporating a bale ejection mechanism in accordance with the principles of the present invention.

Referring initially to FIG. 1, the baler 10 chosen for illustration is a large extrusion-type "square" baler as well-known in the industry wherein bales are formed within a fore-and-aft bale chamber 12 and periodically discharged through a discharge outlet 14 at the rear end of the chamber. Typically, a discharge chute (not shown) is attached to the rear end of chamber 12 for slidingly supporting and guiding bales as they issue from outlet 14 and fall to the ground or are received on an accumulating trailer (also not shown). The discharge outlet 14 is constricted relative to more forward portions of chamber 12 so as to provide resistance to movement of bales through the chamber, and such resistance is used to provide back pressure against which a compacting plunger (not shown) at the front end of bale chamber 12 may work in compacting crop material into bales within the chamber.

The compacting plunger typically reciprocates continuously in repetitive compaction and retraction strokes. During retraction strokes, fresh charges of crop material are introduced into the bale chamber behind the retracting plunger and then compacted against previously compacted material during compaction strokes of the plunger. During each compaction stroke, the plunger not only compacts the new charge against previously compacted material in the chamber, which serves as a kind of moving backstop, but also incrementally advances the charge and previous material rearwardly in the chamber toward outlet 14. At least two bales are typically within chamber 12 at all times throughout baling operations, namely a rearmost, finished bale that is suitably bound by twine or the like and ready to be discharged, and a second partially formed bale in front of the rearmost bale that is in the process of being created by the successive introduction of fresh charges and compaction strokes of the plunger. The rearmost bale serves as the backstop against which new charges of material are compacted to progressively form the next finished bale.

The four sides of bale chamber 12 are presented by a pair of left and right side panels 16, 18, a top wall 20, and a floor 22. In the illustrated embodiment, floor 22 is fixed, but side panels 16, 18 and top wall 20 are hinged adjacent their front ends so that they are adjustably movable inwardly toward one another adjacent outlet 14 to determine the degree of constriction of outlet 14 relative to the front end of chamber 12. Hydraulic "squeeze" mechanism 24 applies inwardly directed pressure to side panels 16, 18 and top wall 20 so that outlet 14 resists enlargement by bales moving through chamber 12 and out outlet 14.

In accordance with the present invention, baler 10 is provided with bale ejecting mechanism broadly denoted by the numeral 26 but only partially visible in FIG. 1. Most of ejecting mechanism 26 is located within or below floor 22, although a pair of its projections 28 are visible in FIG. 1 as well as a selector lever 30 and control switch 32. Much of ejecting mechanism 26 is similar to the ejecting mechanism of the incorporated by reference U.S. Pat. No. 5,540,144.

Figure 4:
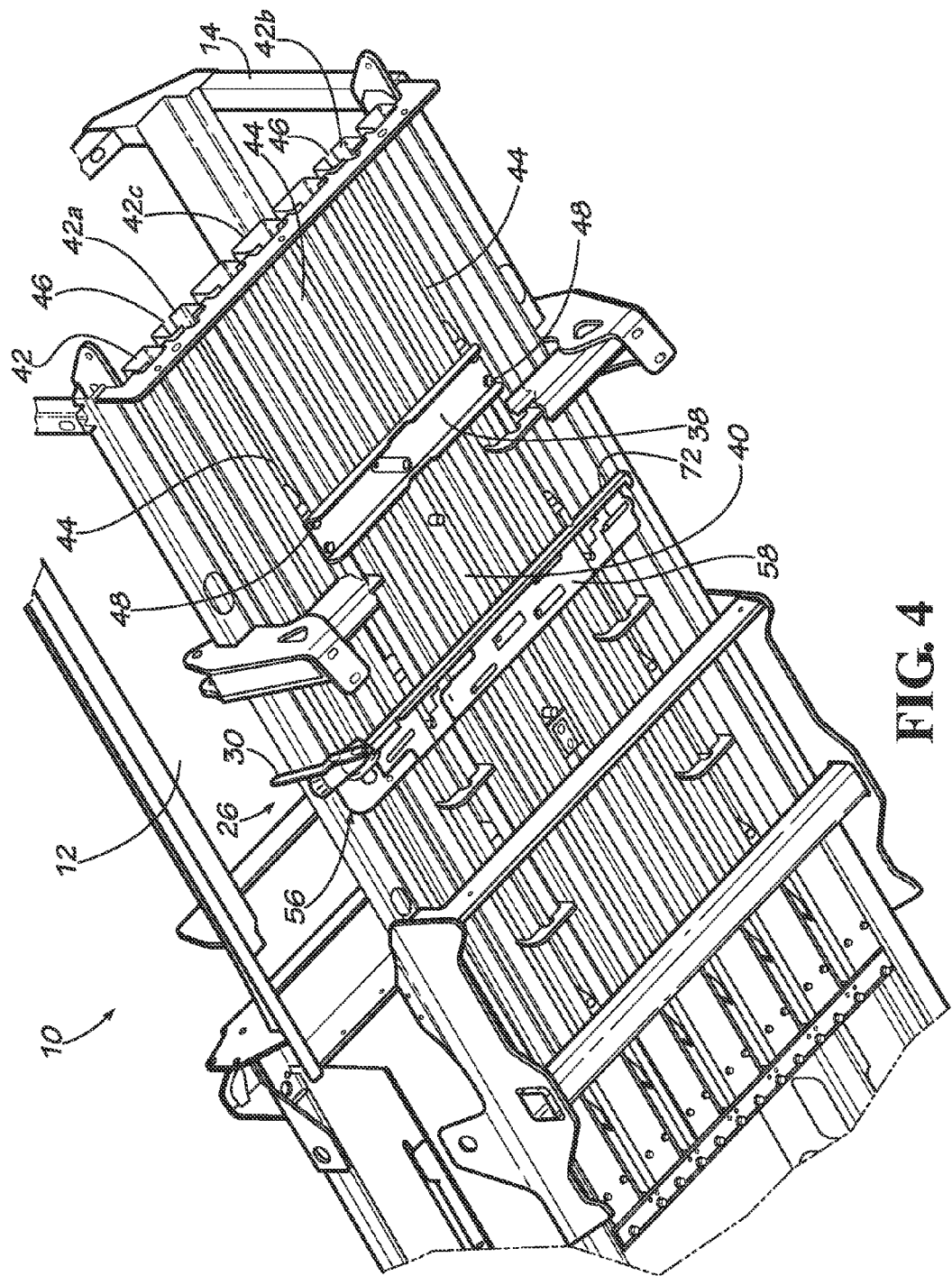
FIG. 4 is a fragmentary, left, rear bottom isometric view of the bale chamber showing certain components of the selector assembly portion of the ejection mechanism that determines which projections will be in their extended position during operation of the ejection mechanism.
Figure 5:
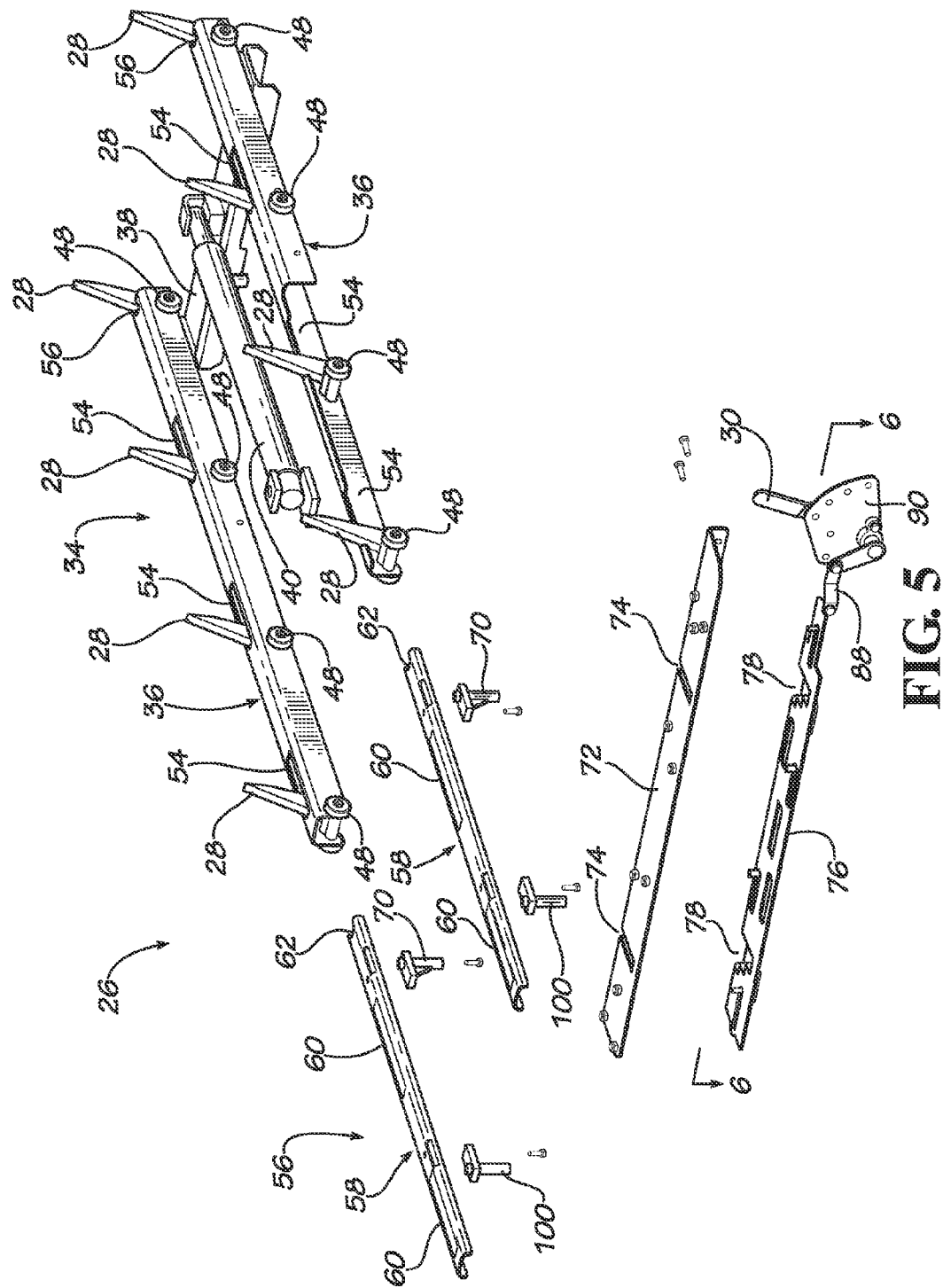
FIG. 5 is an exploded isometric view of the ejection mechanism.

FIG. 5 illustrates the entire ejecting mechanism 26, with the exception of switch 32 in FIG. 1. The primary working component of ejecting mechanism 26 is a shuttle 34 that is comprised in part by a pair of elongated, fore-and-aft extending and laterally spaced apart and identical channels 36 of inverted, generally U-shaped configuration. Channels 36 are rigidly interconnected across their rear ends by a transverse bar 38 that completes shuttle 34. A fore-and-aft power device in the form of a hydraulic cylinder 40 has its rod end connected to bar 38 and its cylinder end connected to the floor 22 (FIG. 4) for the purpose of driving shuttle 34 in a fore-and-aft direction relative to chamber 12 through ejection and retraction strokes.

Figure 3:
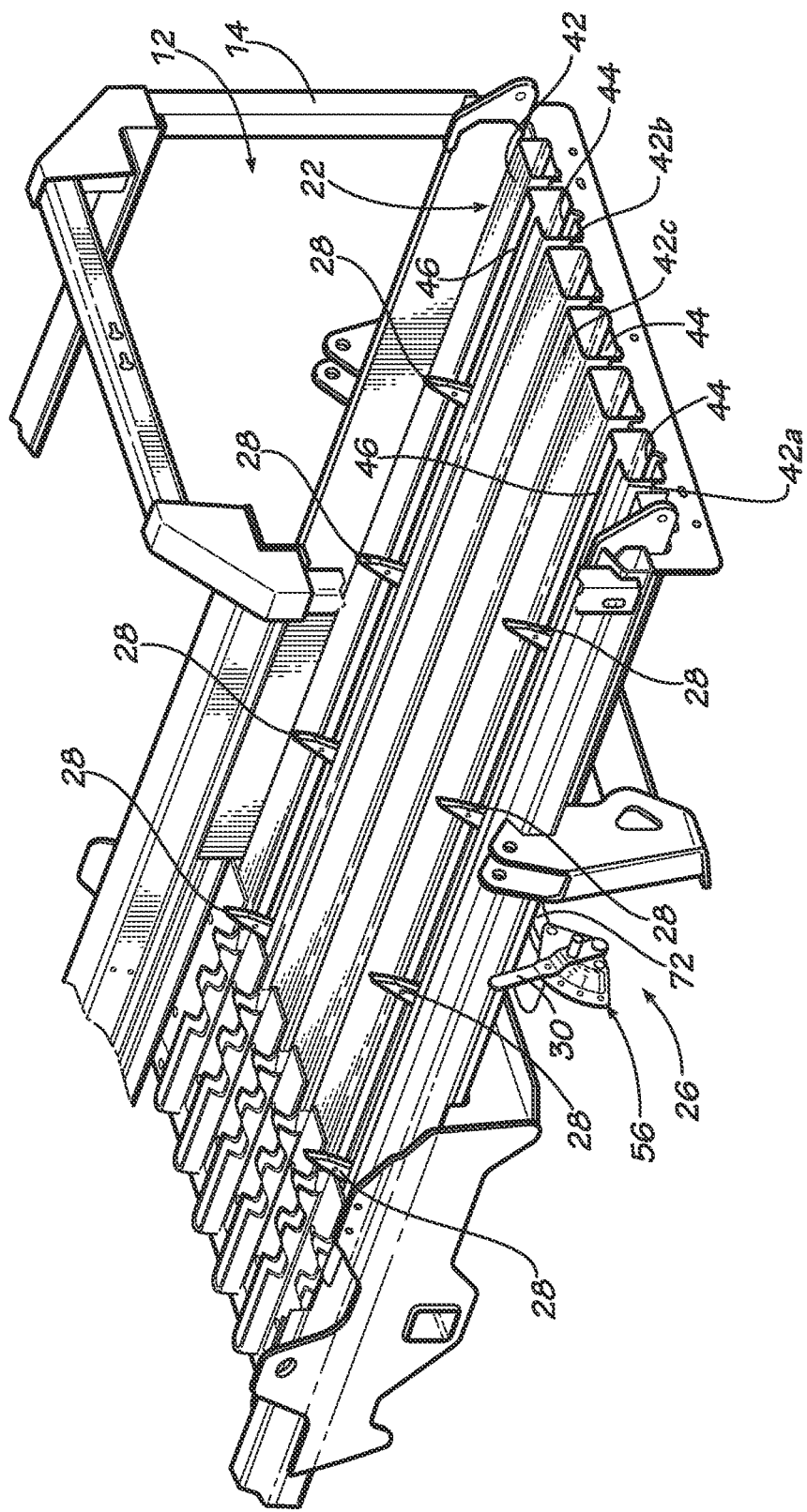
FIG. 3 is a fragmentary, left rear isometric view of the interior of the bale chamber of the baler illustrating the bale engaging projections of the ejecting mechanism in their extended, fully deployed position.
Figure 13:
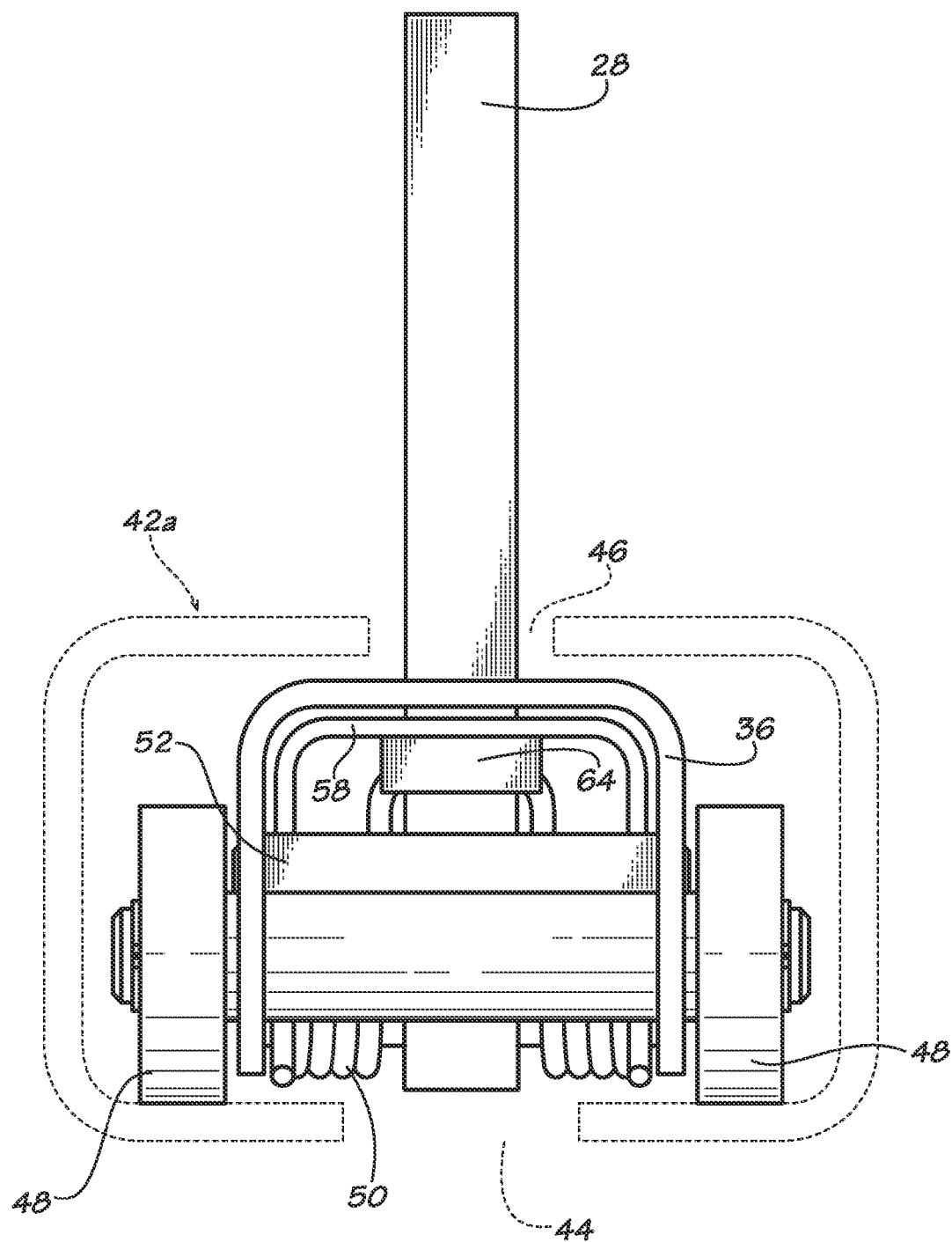
FIG. 13 is an enlarged, transverse cross-sectional view of the channel and selector member of FIGS. 10 and 12 taken substantially along line 13-13 of FIG. 12.

As illustrated best in FIGS. 3, 4, and 13, floor 22 is defined by a series of generally tubular, fore-and-aft and slightly laterally spaced rails 42. All of the rails 42 have a full-length longitudinal slot 44 along their bottom extent, but two of the rails 42*a* and 42*b* next adjacent the two most outboard rails also have a full-length longitudinal slot 46 along their top extent. The two channels 36 of shuttle 34 are complementally received within rails 42*a* and 42*b* and shift longitudinally within rails 42*a*, 42*b* during actuation of shuttle 34 by cylinder 40. As illustrated in FIG. 3, projections 28 of shuttle 34 are disposed to extend upwardly through top slot 46 in rails 42*a*, 42*b* when in the extended position and to move along top slot 46 during actuation of the shuttle. As shown in FIG. 4, transverse bar 38 passes beneath rails 42 but is fixed to respective ones of the channels 36 by bolts 48 that pass upwardly through the bottom slot 44 in each rail 42*a*, 42*b*. As also shown in FIG. 4, the shuttle actuating cylinder 40 is largely, if not entirely, housed within the center rail 42*c* of rails 42 and is accessible via bottom slot 44 in center rail 42*c*.

Each channel 36 of shuttle 34 has four pairs of antifriction wheels 48 that facilitate linear movement of the channel within its corresponding rail 42*a* or 42*b*. Each channel also carries four of the pivotally mounted bale-engaging projections 28 at evenly spaced locations along the length of the channel. Each projection 28 on channel 36 is biased into a raised or extended position projecting into bale chamber 12 by a torsion spring 50 as illustrated, for example, in FIGS. 7, 8, 12, and 13, and is provided with a stop 52 that precludes upward pivoting of the projection beyond the extended position illustrated in the figures. The three forwardmost projections 28 on each channel 36 are disposed to pass through three corresponding clearance slots 54 in the top wall of the channel, while the rearmost projection 28 operates primarily in an unobstructed area beyond the rear end of the channel but is cleared by a small notch 56 (FIG. 5) in the top wall of the channel when in the extended position.

Figure 17:
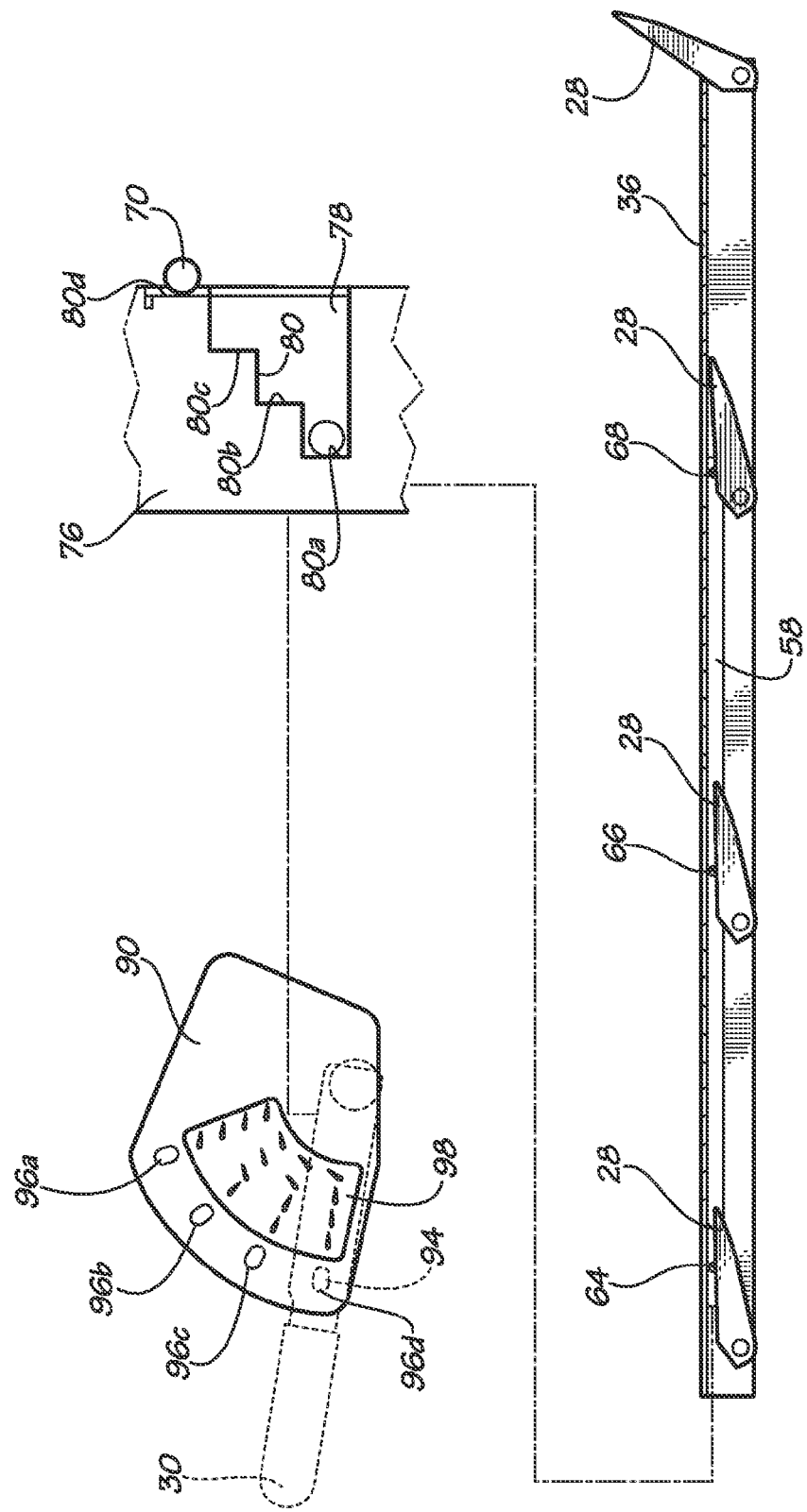
FIG. 17 is a schematic illustration similar to FIGS. 14, 15, and 16 of the condition of things when the selector assembly is set for having only the rearmost bale engaging projection raised in the extended position during an ejection stroke of the mechanism.

Each of the four projections 28 on each channel 36 can be forced down against the resistance of its spring 50 into a lowered position outside of bale chamber 12 as illustrated, for example, by the three forwardmost projections in FIG. 17. While the rearmost projection 28 in that figure is illustrated in the raised position, it will be understood that the rearmost projection can, indeed, be forced fully down and out of bale chamber 12 as well. In the case of the rearmost projection 28, however, such retraction is caused only when a bale overlies the projection and there is no rearward movement of shuttle 34 relative to the bale, while in the case of the three forwardmost projections 28, such retraction is caused either by an overlying bale or a separate selector assembly as hereinafter described.

In this regard, bale ejecting mechanism 26 further includes a selector assembly broadly denoted by the numeral 56 in FIG. 5. One of the components of selector assembly is the selector lever 30 referred to earlier and disposed on the left exterior side of the baler in FIG. 1. Lever 30 is utilized to determine the number and pattern of projections 28 on channels 36 that will be in the extended position when shuttle 34 is operated in a bale ejecting cycle.

Figure 12:
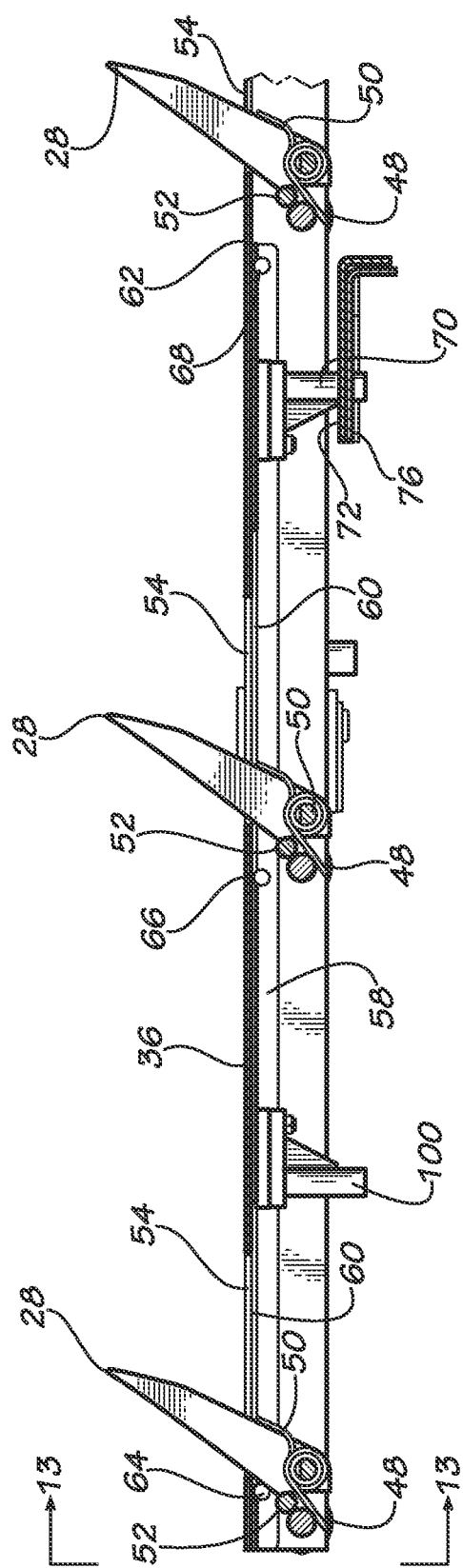
FIG. 12 is a fragmentary, longitudinal cross-sectional view of the channel and selector member of FIG. 10 taken substantially along line 12-12 of that figure.

Selector assembly 56 further includes a pair of elongated, inverted U-shaped selector members 58 that are complementally received within the corresponding channels 36 between the top wall of the channel and the stops 52 (FIGS. 12, 13). Selector members 58 are carried by channels 36 for movement with shuttle 34 during its ejection and retraction strokes, but are also adapted to be adjustably longitudinally shifted relative to channels 36 by a small amount on those occasions when the operator desires to select a different pattern of raised projections. In other words, the position of each selector member 58 relative to its channel 36 determines which of the projections 28 on that channel will be in the extended position when the shuttle commences its next ejection stroke and which will be in the retracted position.

Each selector member 58 is approximately three-fourths the length of its corresponding channel 36 and controls the position of only the three forwardmost projections 28. The rearmost projection 28 is continuously in the extended position unless pushed down into the retracted position by an overhead bale. A pair of longitudinally spaced clearance slots 60 in the top wall of each selector member 58 are generally aligned with the two forwardmost clearance slots 54 in the corresponding channel 36, and a clearance notch 62 in the rear end of each selector member 58 is disposed to generally register with the rearmost clearance slot 54 in the corresponding channel 36 when selector member 58 is in its rearmost adjusted position relative to channel 36.

Figure 10:
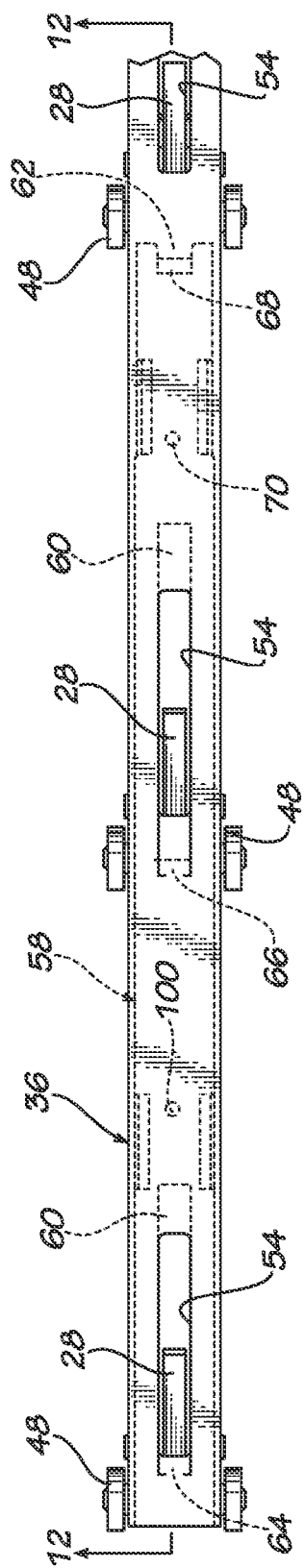
FIG. 10 is a fragmentary, top plan view of one of the channels of the ejection mechanism with its internally disposed selector member shown in phantom lines, the projections being shown in the extended position.
Figure 11:
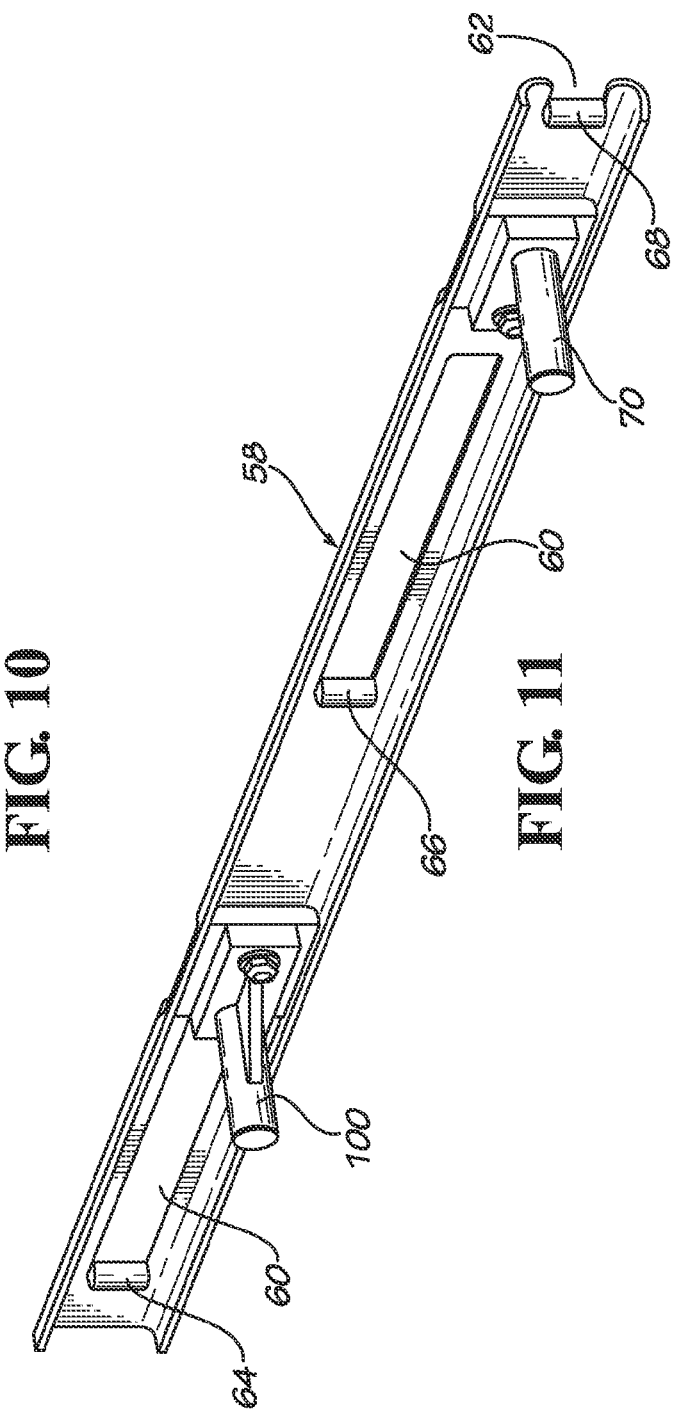
FIG. 11 is a bottom isometric view of one of the two selector members of the ejection mechanism.

With particular reference to FIGS. 10, 11 and 12, a first transversely extending shoulder 64 is carried by each selector member 58 adjacent the front end of the forewardmost clearance slot 60, a second transversely extending shoulder 66 is carried by each selector member 58 adjacent the front end of the second clearance slot 60, and a third transversely extending shoulder 68 is carried by each selector member 58 adjacent the front end of the notch 62. Such shoulders 64, 66, 68 are disposed for bearing against and operating, i.e., forcing down, selected ones of the three forwardmost projections 28 depending upon the fore-and-aft position of the selector member 58 relative to the channel 36.

It will be noted that the three forwardmost projections 28 are equally spaced apart along each channel 36. Likewise, the three shoulders 64, 66, 68 are equally spaced from one another. However, the spacing between shoulders 64, 66, and 68 is slightly less than the spacing between projections 28. As illustrated in FIGS. 12 and 14-17, the spacing of projections 28 and shoulders 64, 66, and 68 is such that when shoulder 64 is bearing against the front side of the forwardmost projection 28 but not deflecting it down into the retracted position, shoulder 66 is spaced forwardly from its projection 28 by one unit of space, while shoulder 68 is spaced forwardly from its projection 28 by two units of space. Therefore, when selector member 58 is shifted rearwardly relative to channel 36 by one unit into the retaining position shown in FIG. 15, shoulder 64 pushes its projection 28 down into the retracted position and shoulder 66 comes into engagement with the front side of its projection 28, while shoulder 68 moves one unit closer to its projection 28. When selector member 58 is shifted rearwardly relative to channel 36 by another unit to the retaining position shown in FIG. 16, shoulder 64 continues to hold down its projection 28 while shoulder 66 now pushes its projection 28 down into the retracted position and shoulder 68 comes to bear against the front side of its projection 28. When selector member 58 is shifted rearwardly relative to channel by a third unit to the retaining position shown in FIG. 17, shoulders 64 and 66 continue to hold down their projections 28 while shoulder 68 now pushes its projection 28 down into the retracted position as well.

In accordance with the present invention, selector members 58 are shifted between their various retaining positions utilizing a power device, rather than requiring manual shifting. In the illustrated embodiment, such power device is the hydraulic cylinder 40 that operates shuttle 34. While cylinder 40 is not directly coupled with selector members 58, if selector members 58 are temporarily held against joint movement with shuttle 34 when cylinder 40 moves it, the result is an adjustment of the relative position between the selector members 58 and channels 36. In the illustrated embodiment, this movement of the shuttle 34 relative to the selector members 58 results in having the shoulders 64, 66, 68 operate their respective projections 28 or uncover them as the case may be, depending upon the extent and direction of the relative movement.

In order to effect this type of relative movement between the shuttle 34 and the selector members 58, the selector assembly 56 further includes a fixed protuberance in the form of a rear peg 70 projecting downwardly from the underside of each selector member 58 forwardly adjacent the shoulder 68. A cross bar 72 fixed to the bottom of bale chamber 12 as shown in FIG. 4 forms another part of selector assembly 56 and has a pair of rearwardly opening slots 74 that are disposed to receive pegs 70 when shuttle 34 is near the front end of its retraction stroke.

Figure 6:
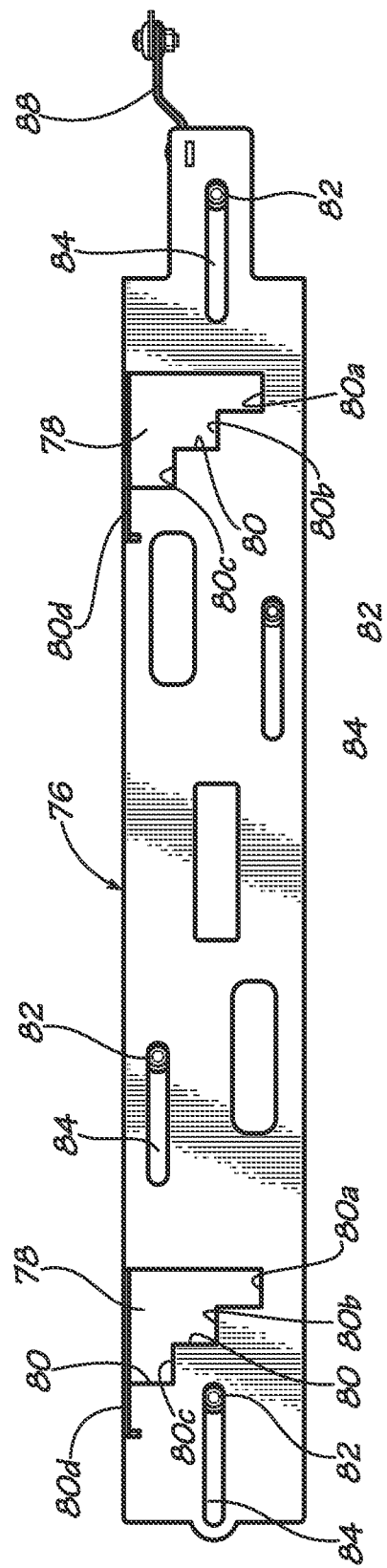
FIG. 6 is an enlarged top plan view of the selector plate of the selector assembly illustrating the abutment steps of the plate and taken substantially along line 6-6 of FIG. 5.
Figure 14:
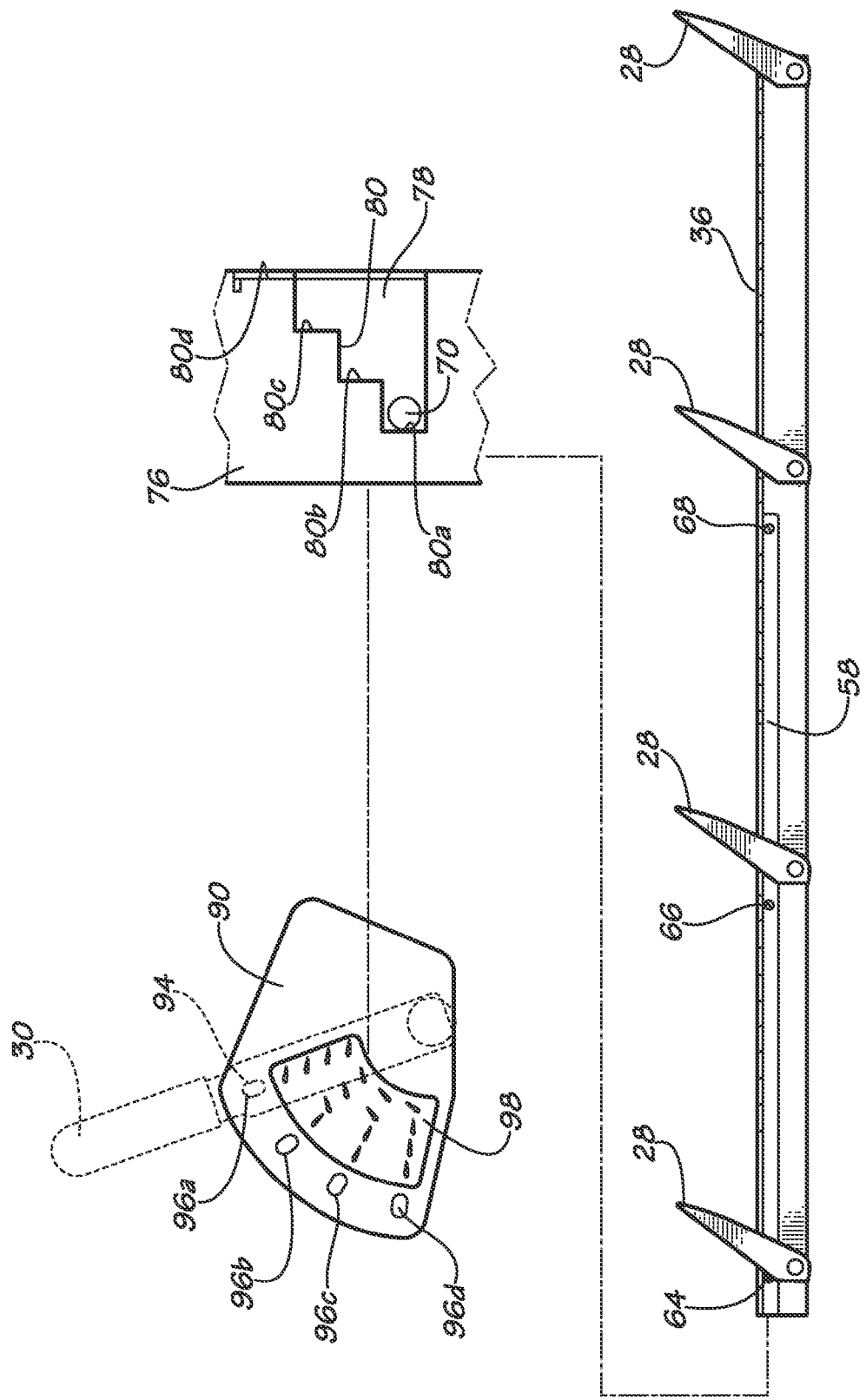
FIG. 14 is a schematic illustration of the condition of things when the selector assembly of the mechanism is set for having all of the bale engaging projections raised in the extended position during an ejection stroke of the mechanism.
Figure 15:
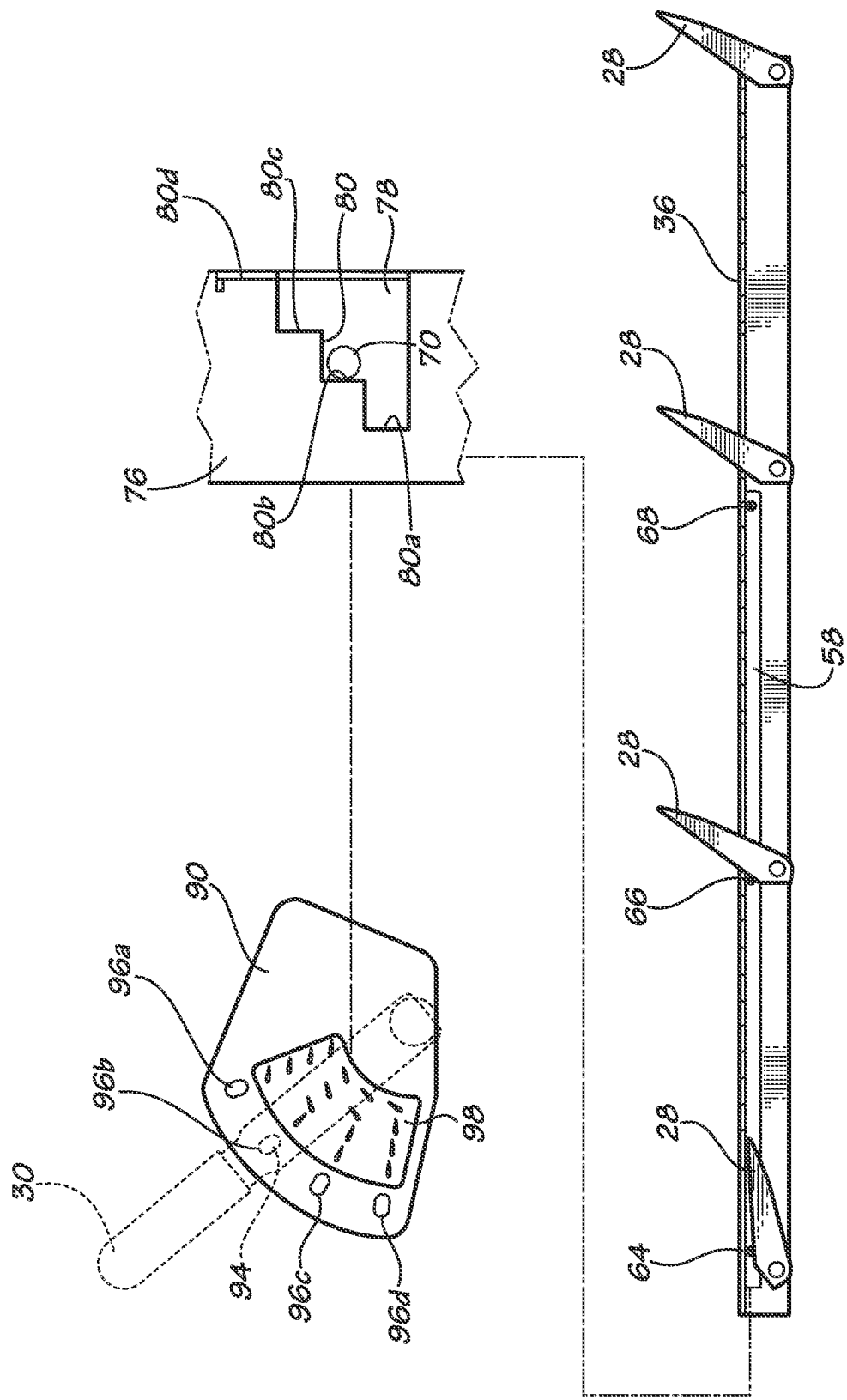
FIG. 15 is a schematic illustration similar to FIG. 14 of the condition of things when the selector assembly is set for having the three rearmost bale engaging projections raised in the extended position during an ejection stroke of the mechanism.
Figure 16:
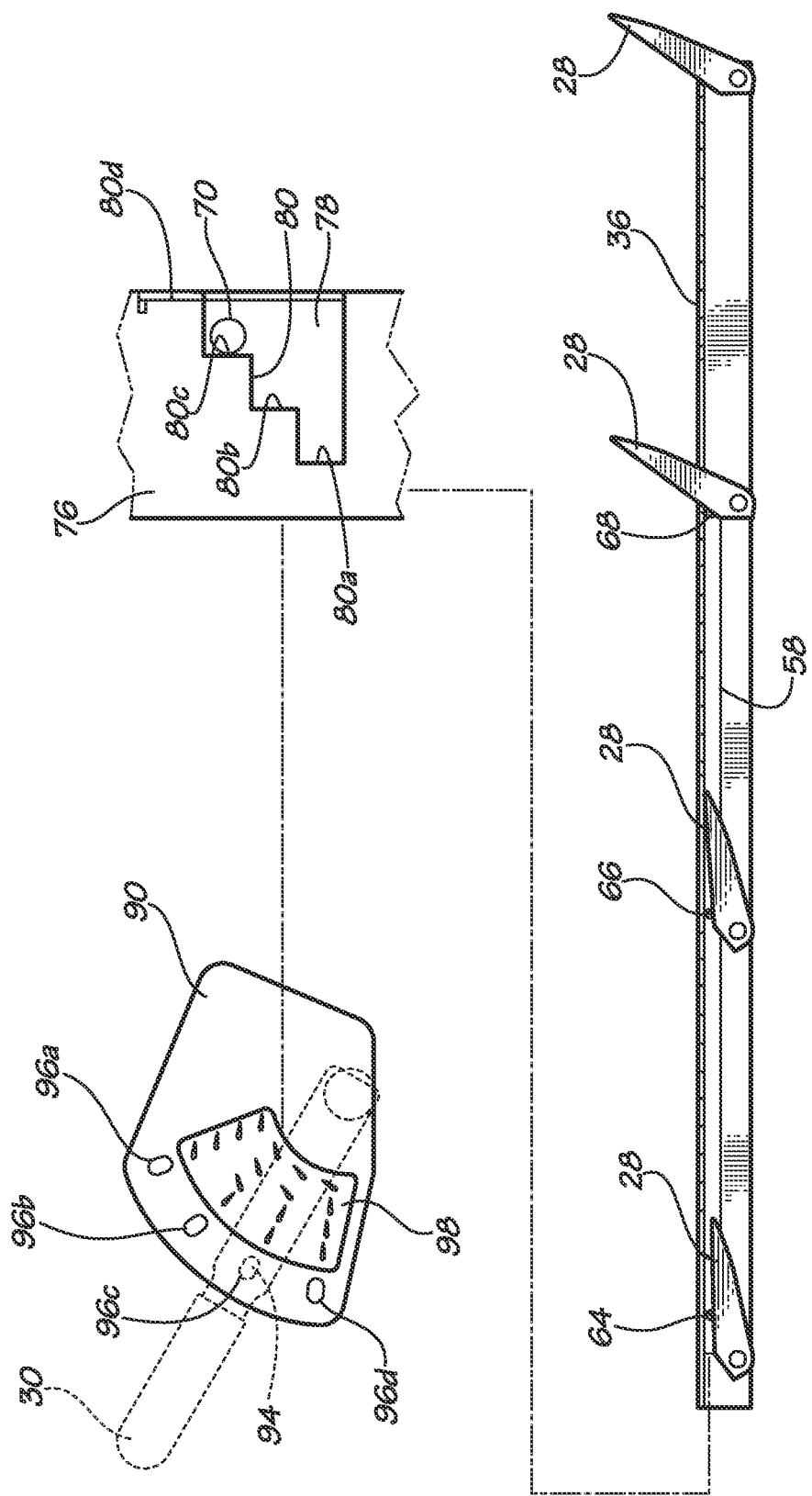
FIG. 16 is a schematic illustration similar to FIGS. 14 and 15 of the condition of things when the selector assembly is set for having only the two rearmost bale engaging projections raised in the extended position during an ejection stroke of the mechanism.

A shifter member in the form of a transverse plate 76 (FIGS. 6, 9) comprises another part of selector assembly 56 and is attached to the bottom of cross bar 72 in such a manner that shifter plate 76 can be adjustably moved longitudinally of cross bar 72 by the selector lever 30 between four different, selectable positions corresponding to the four different retaining positions of the selector members 58. Shifter plate 76 has a pair of rearwardly facing openings 78 along its rear edge that underlie and register with the slots 74 to receive pegs 70 when shuttle 34 is near the front end of its retraction stroke. One lateral edge 80 of each opening 78 is configured in a stair-step pattern to present a series of four rearwardly facing abutment steps 80a, 80b, 80c, and 80d that can be positioned to interact with the corresponding peg 70, depending upon the selected transverse position of the shifter plate 76. Abutment step 80a is for placing all projections up in the extended position as illustrated in FIG. 14, abutment step 80b is for placing the forwardmost projection down in the retracted position and the remaining projections up in the extended position as illustrated in FIG. 15, abutment step 80c is for placing the two forwardmost projections down in the retracted position and the two remaining projections up in the extended position as illustrated in FIG. 16, and abutment step 80d is for placing the three forwardmost projections down in the retracted position and the remaining rearmost projection up in the extended position as illustrated in FIG. 17. Abutment step 80b is spaced one spacing unit from abutment step 80a, abutment step 80c is spaced two spacing units from abutment step 80a, and abutment step 80d is positioned three spacing units from abutment step 80a.

Figure 7:
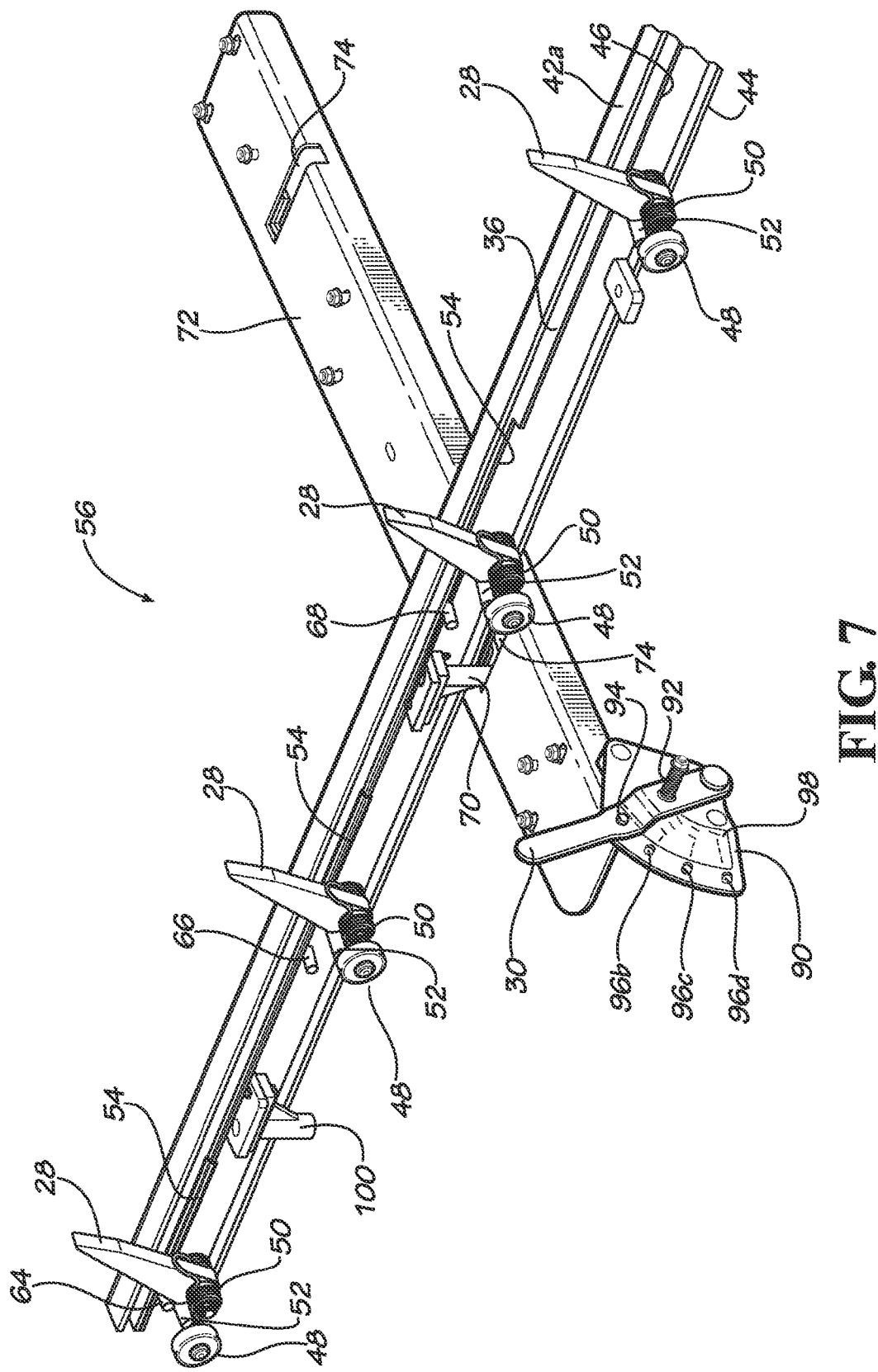
FIG. 7 is an enlarged, left, rear isometric view of a portion of the selector assembly of the ejection mechanism with certain structure removed to reveal internal details of construction.
Figure 8:
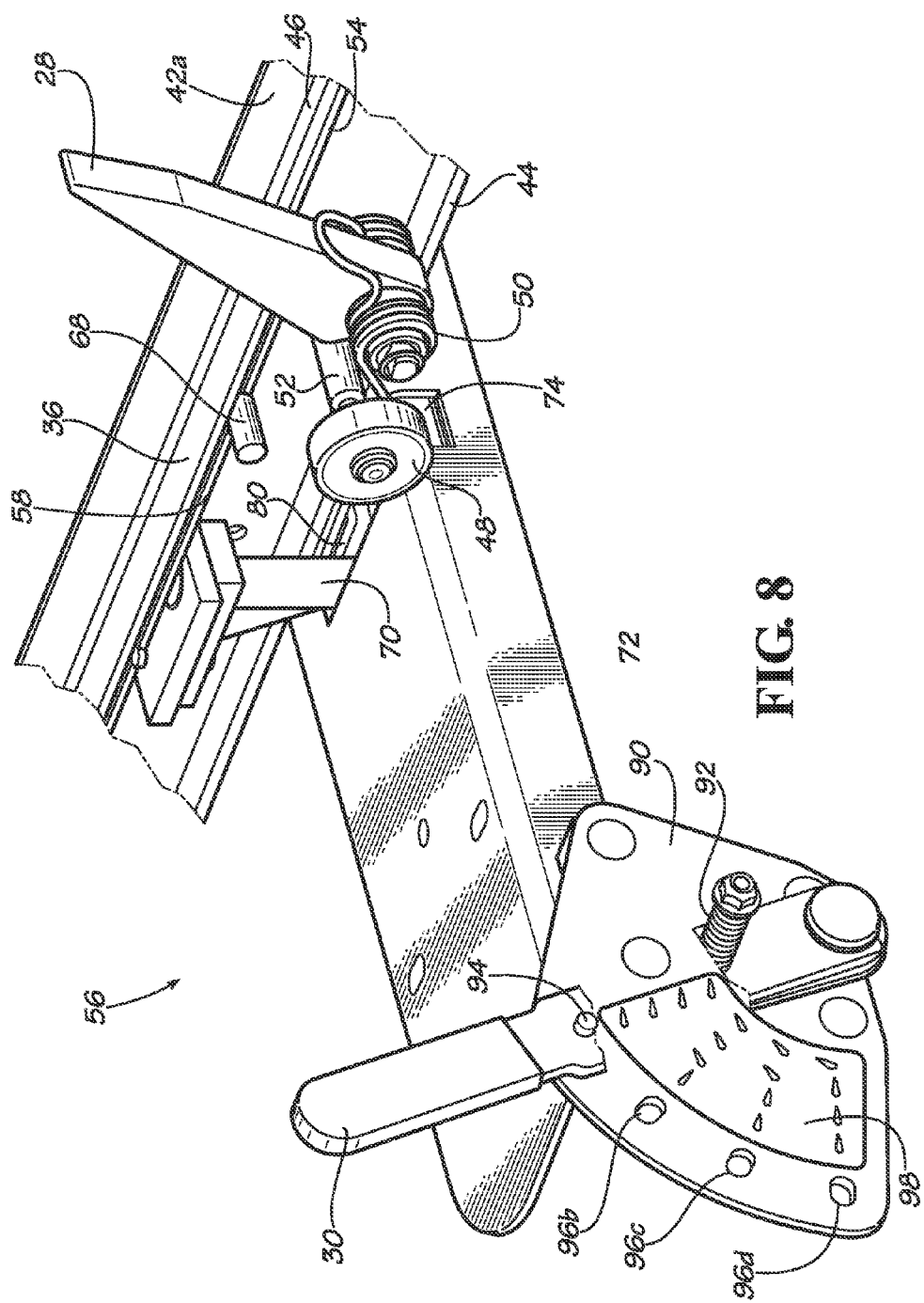
FIG. 8 is a view similar to FIG. 7 but on an enlarged scale.
Figure 9:
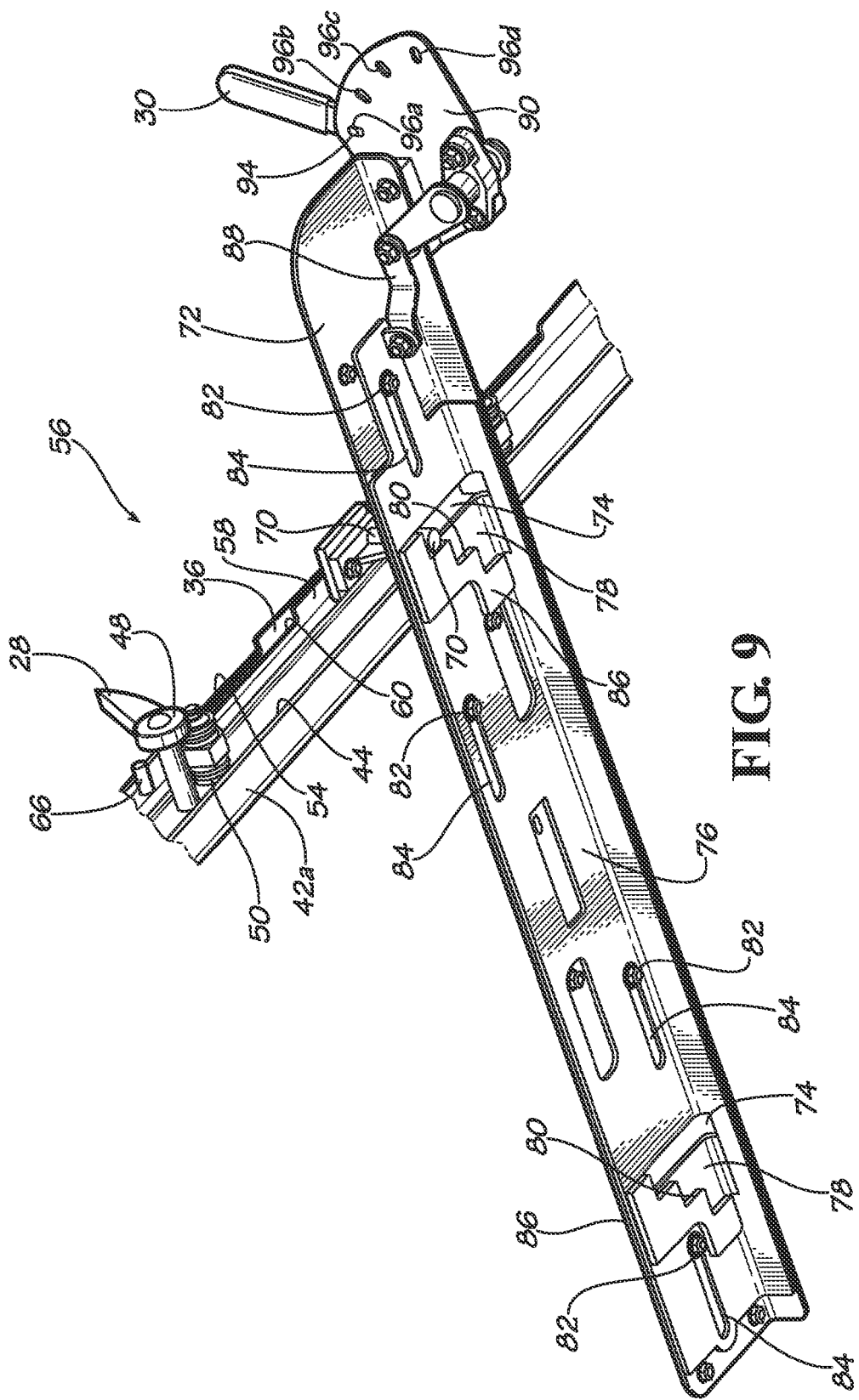
FIG. 9 is a fragmentary, left front bottom isometric view of the selector assembly with certain structure removed to reveal internal details of construction.

Shifter plate 76 is slidingly attached to the bottom side of cross bar 72 by a number of bolts 82 (FIGS. 6, 9) that pass through corresponding, transversely extending, elongated slots 84. In FIG. 9, shifter plate 76 is shown fully shifted toward the right side of the baler such that bolts 82 are disposed at the left ends of slots 84 and abutment steps 80a are disposed in registration with the slots 74 of cross bar 72. In this position, abutment steps 80a are essentially flush with the forwardmost end of slots 74. A pair of stair-step reinforcing plates 86 are fixed to the underside of shifter plate 76 along the stair-step edges 80 of openings 78 to add structural strength to that region. In FIGS. 7, 8 and 9 shuttle 34 is shown at the end of its retraction stroke in its fully retracted, forwardmost position, and selector members 58 are shown in their forwardmost retaining position relative to shuttle 34 wherein none of the projections 28 are held down.

The left end of shifter plate 76 is operably connected to selector lever 30 via a linkage 88 (FIG. 9) so that operation of lever 30 causes corresponding shifting of shifter plate 76. Lever 30 cooperates with a stationary, quadrant-shaped plate 90 to releasably latch lever 30 in any one of four selectable positions corresponding to the four patterns of raised/retracted projections 28. A spring assembly 92 (FIGS. 7, 8) yieldably biases lever 30 toward plate 90 so a fixed boss 94 on lever 30 can removably latch into a selected one of four holes 96a, 96b, 96c and 96d in plate 90 corresponding to the projection patterns. A decal 98 or the like on the rear face of quadrant plate 90 contains indicia representing the four different positions available for lever 30 corresponding to the four patterns of raised/retracted projections 28. In FIGS. 7, 8 and 9 lever 30 is shown in the fully raised position corresponding to the fully raised condition for all the projections 28.

Selector assembly 56 also includes a means for resetting all projections 28 to the extended position at the completion of each ejection stroke of shuttle 34, regardless of the setting previously selected by lever 30. In this regard, each selector member 58 is provided with a second protuberance in the form of a front peg 100 projecting downwardly from the underside of the selector member at a position spaced forwardly from the first peg 70. The front peg 100 is disposed to strike the front edge of shifter plate 76 and/or the front edge of cross bar 72 when shuttle 34 is moving rearwardly in its ejection stroke and is almost at the end of that stroke. When front peg 100 strikes shifter plate 76 and/or cross bar 72, the selector member 58 stops further rearward movement with shuttle 34 while shuttle 34 continues a short distance further to the end of its stroke. This relative forward movement of selector member 58 relative to shuttle 34 causes shoulders 64, 66 and 68 to "uncover" all three of the three forwardmost projections 28 so their springs 50 can flip them up to the extended position when an overlying bale has left the bale chamber, if they are not otherwise already in the extended position. Of course, the rearmost projection 28 flips up too when the overlying bale leaves because there is nothing to hold it in the retracted position other than an overlying bale. When shuttle 34 returns forwardly in a retraction stroke and reaches a point near the forward end of the stroke, projections 28 are once again subjected to adjustment into the particular raised/retracted pattern established by the position of selector lever 30.

Operation

During each retraction stroke of shuttle 34, the rear pegs 70 of selector members 58 enter slots 74 in cross bar 72 as the forwardly moving shuttle 34 nears the front end of its retraction stroke. Depending upon the position of selector lever 30, selector members 58 may or may not become shifted rearwardly relative to channels 36 of shuttle 34 at this time. For example (referring to FIGS. 14-17), if lever 30 is already in its fully raised position at hole 96*a* as shown in FIG. 14, each abutment step 80*a* will be flush with the front edge of its slot 74 and not interfere with peg 70. Thus, peg 70 will travel to the front edge of its slot 74 as the shuttle 34 and selector members 58 stop forward movement at the same time at the front end of the retraction stroke. Consequently, on commencement of the next ejection stroke as illustrated in FIG. 14, all four of the projections 28 of each channel 36 are in an uncovered condition by the selector member 58 and are free to flip up to the extended position for digging into the bottom of an overhead bale and driving the bale rearwardly for the duration of the ejection stroke.

If selector lever 30 is lowered one increment to hole 96*b* as illustrated in FIG. 15, each abutment step 80*b* moves into its slot 74 and blocks the path of travel of the returning peg 70. Consequently, the selector member 58 is stopped before shuttle 34 reaches its fully retracted position, causing each selector member 58 to be effectively shifted one spacing unit rearwardly so forwardmost shoulder 64 engages and retracts forwardmost projection 28. Therefore, as shown in FIG. 15, when the next ejection stroke commences, the forwardmost projection 28 is in the retracted position but the three remaining projections 28 are in the extended position.

If selector lever 30 is lowered another increment to hole 96*c* as illustrated in FIG. 16, each abutment step 80*c* moves into its slot 74 and blocks the path of travel of the returning peg 70 by another spacing unit. Consequently, the selector member 58 is stopped an additional spacing unit sooner than shuttle 34, causing each selector member 58 to be effectively shifted another spacing unit rearwardly so that shoulders 64 and 66 engage and retract the two forwardmost projections 28. Therefore, as shown in FIG. 16, when the next ejection stroke commences, the two forwardmost projections 28 are in the retracted position but the two rearmost projections 28 are in the extended position.

If selector lever 30 is lowered a third increment to hole 96*d* as illustrated in FIG. 17, each abutment step 80*d* moves into its slot 74 and blocks the path of travel of the returning peg 70 by a third spacing unit. Therefore, the selector member 58 is stopped a third spacing unit sooner than shuttle 34, causing each selector member 58 to be effectively shifted rearwardly by three spacing units so that all three shoulders 64, 66 and 68 engage and retract the three forwardmost projections 28 as shown in FIG. 17. As a result, when the next ejection stroke commences, only the rearmost projection 28 is in the raised position.

With reference to FIG. 18, as the shuttle 34 approaches the rear end of each ejection stroke (a maximum of three spacing units before the end of the stroke), the front peg 100 of each selector member 58 may strike the front edge of shifter plate 76 and/or cross bar 72 and stop further progress of the selector member, although shuttle 34 keeps moving rearwardly until reaching the end of its stroke. Depending on the position of selector members 58 at this time, each selector member 58 may be effectively shifted a maximum of three spacing units forwardly relative to shuttle 34, causing all three shoulders 64, 66 and 68 to be withdrawn from their projections 28 as shown in FIG. 18. If the selector member 58 is already in the full forward position uncovering the three forwardmost projections 28 when front peg 100 strikes shifter plate 76 and/or cross bar 72 (because selector lever 30 is in the fully raised position at hole 96*a*), no relative rearward shifting of selector members 58 needs to or will occur.

Thus, during each full ejecting cycle of shuttle 34, the projections 28 are reset to the extended position at the rear end of the ejection stroke and set to a selected raised/retracted pattern at the front end of the retraction stroke. Once a raised/retracted pattern has been selected, unless the selector lever 30 is adjusted in the meantime, the projections are reestablished in that same selected pattern each time the shuttle retracts, even though the projections have been reset to an all raised pattern at the rear end of the ejection stroke. Multiple strokes of the shuttle 34 with the same setting of projections 28 will typically be necessary to eject a bale as each stroke is on the order of only twenty-four inches in length, while each bale may be as long as eight feet in length, depending upon operator preference. Each step of stepped edge 80 in the shifter plate 76 is on the order of 1⅜ inches (35 millimeters) from its next adjacent step such that the maximum possible displacement of each selector member 58 relative to its channel 36 is on the order of 4⅛ inches (105 millimeters). In most instances it will not be necessary to change the lever setting throughout the duration of ejecting a particular bale, once that setting has been chosen.

In the preferred embodiment, bale ejecting mechanism 26 is operated through the use of the control switch 32 on the left side of the baler. Thus, the operator stands beside the baler when operating the bale ejecting mechanism, rather than operating the system from the seat of the towing tractor.

In order to prepare the system for bale ejection, the operator first manipulates switch 32 in such a manner that hydraulic pressure is relieved in the squeeze mechanism 24. This decreases the resistance to ejecting movement of the ejecting bale(s). Then, he must decide which of the four different patterns of raised/retracted projections 28 to utilize for the ejection strokes. This is usually determined by establishing the location of the interface between the front end of the rearmost bale and the rear end of the next bale in bale chamber 12.

Figure 2:
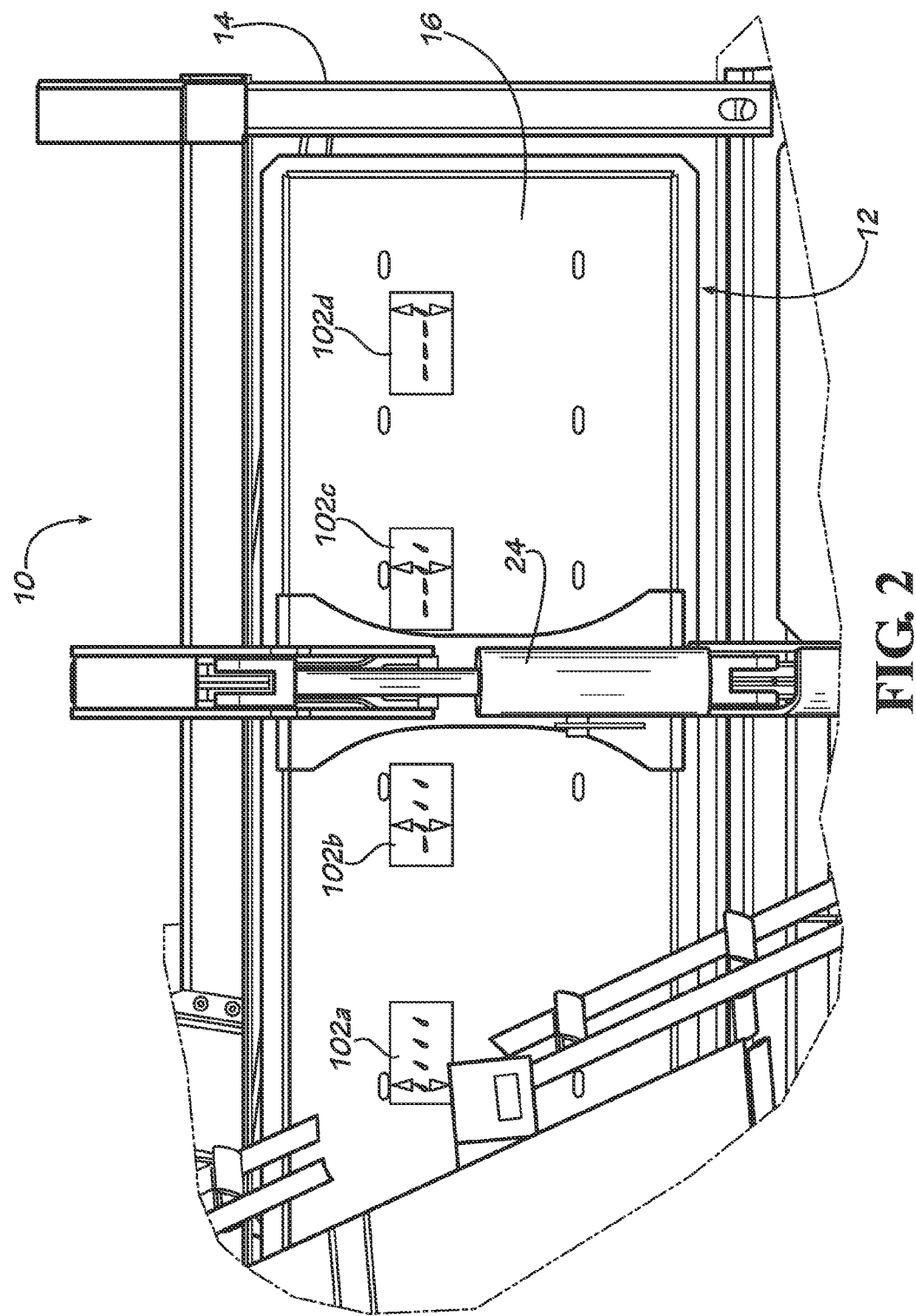
FIG. 2 is a fragmentary elevational view of the left rear side of the baler illustrating decals used in setting up bale-ejecting projections of the mechanism in an appropriate pattern.

As shown in FIGS. 1 and 2, a set of four decals 102*a*, 102*b*, 102*c*, and 102*d* may be provided on the left side of the bale chamber to assist the operator. Assuming for the sake of this explanation that only the rearmost bale is to be ejected, if the interface between the bales is forward of the arrowheads of decal 102*a*, all of the projections 28 are to be in the raised position during the ejection stroke. If the interface is between the arrowheads of decals 102*a* and 102*b*, the forwardmost projection 28 should be down and the three remaining projections 28 up during the ejection stroke. If the interface is between the arrowheads of decals 102*b* and 102*c*, the two forwardmost projections 28 should be down and the two rearmost projections 28 should be up during the ejection stroke. And, if the interface is between the arrowheads of decals 102*c* and 102*d*, the three forwardmost projections 28 should be down and only the rearmost projection 28 should be up during the ejection stroke.

The operator then compares the raised/lowered pattern determined by the appropriate decal 102*a-d* with the position of the selector lever 30 as indicated by decal 98 adjacent the lever. If the position of lever 30 matches the appropriate one of the decals 102*a-d*, the operator does not shift the lever and simply operates control switch 32 in the appropriate manner to initiate an ejection cycle of shuttle 34. The raised projections 28 engage the bottom of the bale during each ejection stroke of shuttle 34 to partially advance the bale out of the baling chamber and then fold down into the retracted position as they wipe harmlessly against the bottom of the bale during the retraction stroke. The cycle is repeated as many times as necessary to fully eject the bale.

If upon comparing the appropriate one of the decals 102a-d with the lever position it is determined that more projections than needed are in the raised position, lever 30 is lowered to the appropriate matching hole 96b-d. Note that if lever 30 does not move easily at this time, the rear pegs 70 are probably blocking adjustment of shifter plate 76. In that event, shuttle 34 should be actuated slightly rearwardly in the ejecting direction to move pegs 70 out of the way, whereupon adjustment of lever 30 may completed. Thereafter, the shuttle 34 should be actuated in the retracting direction to the full forward end of its stroke to lower the appropriate projections to the lowered position.

If upon comparing the appropriate one of the decals 102a-d with the lever position it is determined that more projections 28 are down than desired, shuttle 34 should be actuated in the ejection direction to the full rearward end of its stroke to reset the selector members 58 to their full forward positions relative to shuttle 34. Then the operator raises the selector lever 30 to the appropriate raised/retracted position and retracts shuttle 34 to its full forward position to set the projections 28 accordingly.

Obviously, if a second bale is to be off-loaded after the endmost bale has been ejected, the operator checks the position of the rear end of the second bale relative to the arrowheads of decals 102a-d and sets selector lever 30 accordingly. He then simply actuates shuttle 34 through repeated ejection cycles until the second bale is fully ejected. If both bales are to be off-loaded simultaneously, it is important that at least some of the projections 28 are disposed under the second bale as well as the endmost bale.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

What is claimed is:

1. Bale ejecting mechanism for ejecting a bale from the open end of a bale case comprising:
   a shuttle shiftable axially of the bale case generally toward and away from said open end in repetitive ejection and retraction strokes,
   said shuttle having a series of projections yieldably biased to an extended position projecting into the bales case for engaging and moving a bale during an ejection stroke of the shuttle,
   said projections being shiftable into a retracted position disposed outside of the bale case to avoid engaging and moving a bale during an ejection stroke of the shuttle;
   a selector member movable with the shuttle during ejection and retraction strokes of the shuttle but shiftable relative to the shuttle to any one of a number of selectable retaining positions in which the selector member retains selected ones of the projections in the retracted position;
   a power device operably coupled with the shuttle for driving the shuttle through its ejection and retraction strokes; and
   an adjustable shifter member selectably disposable in any one of a plurality of operating positions corresponding to the selectable retaining positions of the selector member, said shifter member being operable when in a selected operating position to engage and shift the selector member relative to the shuttle into a corresponding retaining position as the selector member returns with the shuttle during retraction of the shuttle by the power device, thereby preparing the shuttle for completing the next ejection stroke with selected ones of the projections in the extended position; and
   a stationary support extending across the bale case in a direction transverse to the path of travel of the shuttle and selector member, said shifter member being shiftably mounted on said support for adjusting movement relative thereto in a direction transverse to the path of travel of the shuttle and selector member, and said shifter member having a stair-step series of fixed abutments thereon selectively disposable in the path of travel of the selector member during retraction of the shuttle for the purpose of engaging and stopping the selector member from further travel with the shuttle while the shuttle continues its retraction stroke, whereby to effectively shift the selector member relative to the shuttle into a desired retaining position;
   wherein said selector member has a fixed protuberance engageable with a selected abutment on the shifter member, and said support has a clearance slot for receiving said protuberance during interaction of the protuberance with the selected abutment, said shifter member being shiftable across said slot for placing a selected abutment in the slot.

2. Bale ejecting mechanism as claimed in claim 1, further comprising reset structure disposed for resetting the selector member by engaging and shifting the selector member relative to the shuttle into a retaining position wherein none of the projections are retained in the retracted position by the selector member, wherein said reset structure is disposed to reset the selector member as the shuttle approaches the end of each ejection stroke.

3. Bale ejecting mechanism as claim in claim 1, wherein said shifter member has a plurality of operating abutments corresponding to different retaining positions of the selector member and defining different limits to the path of travel of the selector member during its retraction with the shuttle, said shifter member being shiftable to place a selected one of its abutments in the path of travel of the selector member for engaging and stopping the selector member from further travel with the shuttle during the retraction stroke while the shuttle completes the retraction stroke, whereby to place the selector member in the desired retaining position.

4. Bale ejecting, mechanism as claimed in claim 3, wherein said abutments is arranged in a stair-step pattern, and said shifter member is shiftable in a direction transverse to the path of travel of the selector member and shuttle.

5. Bale ejecting mechanism as claimed in claim 3, wherein said shifter member is provided with an operating lever for use in manually shifting the shifter member into a selected operating position, said operating lever having a latch for releasably holding the lever in a selected position.

6. Bale ejecting mechanism as claimed in claim 1, wherein said selector member has a second fixed protuberance spaced from the first-mentioned protuberance, and said support has fixed reset structure disposed for engagement with said second fixed protuberance as the shuttle approaches the end of each ejection stroke for resetting the selector member into a retaining position wherein none of the projections are retained in the retracted position by the selector member.

7. Bale ejecting mechanism as claimed in claim 1, wherein said shuttle has a pair of laterally spaced series of projections yieldably biased toward the extended position, wherein said selector member is one of a pair of selector members for use with respective ones of the series of projections, and wherein said shifter member is one of a pair of shifter members for use with respective ones of the selector members, and said pair of shifter members are rigidly interconnected for adjustment in unison to a selected operating position for engaging and shifting the selector members in unison.

8. Bale ejecting mechanism as claimed in claim 7, said shifter members being mounted on said support, and further comprising an operating lever operably coupled between the support and the shifter members for shifting the shifter members relative to said support into selected operating positions of the shifter members.

* * * * *